Patented July 22, 1947

2,424,256

UNITED STATES PATENT OFFICE 2,424,256

COLOR DEVELOPERS COMPRISING ARYL-SULFONHYDRAZIDES AND METHODS OF DEVELOPING WITH SAME

Willy A. Schmidt and Joseph A. Sprung, Easton, Pa., assignors to General Aniline & Film Corporation, New York, N. Y., a corporation of Delaware No Drawing. Application January 26, 1945, Serial No. 574,810

21 Claims. (Cl. 95—88)

The present invention relates to color photography and particularly to the production of azo dyestuff images by the utilization of color developers which during development are conditioned for reaction with an azo dyestuff coupling component to produce an azo dyestuff.

Considerable attention has been given by the art to the employment of azo dyestuffs for the formation of color images in color photography. It is known that the azo dyestuffs are more stable than the azo methine and quinoneimine dyes which constitute the dyestuff images produced in color film by the color forming development method devised by Fischer and described in his U. S. P. 1,102,028. Furthermore, the azo dyestuffs give brilliant images and because of the great number of components which may be reacted to produce such dyes, they provide a greater number of alternates for forming the dyestuff images.

Many methods have been proposed by which azo dyestuff images are formed in color film. One method, known as the silver dye bleaching method, involves the pre-dyeing of a silver halide emulsion, the exposure and development of the same and a bleaching of the dyestuff at the places of the silver image. This method is disadvantageous for the reason that the colored emulsions act as filters requiring long exposures to give balanced images in the various emulsion layers.

Another method takes advantage of the fact that diazonium compounds are capable of forming silver antidiazotates. According to this procedure a silver image is bleached and treated with an alkali antidiazotate to convert the bleached silver image into a silver antidiazotate. The treated emulsion is then subjected to the action of a coupling compound in the presence of an acid medium to produce the dyestuff image.

Still another method proposes to incorporate in an emulsion a coupling component, to expose, develop and fix the emulsion and to couple the coupling component with a diazonium compound in the presence of a heavy metal salt. Through the agency of such salt, the dyestuff is formed in the areas free from metallic silver.

These latter methods, a study reveals, have many shortcomings which have militated against their general adoption for practical purposes and have been applied only to a limited extent.

We have now discovered that azo dyestuff images can be prepared by the simple method of developing latent silver halide images, particularly prints, bleached silver images and residual silver salt images with a β-aromatic sulfonhydrazide and the subsequent coupling of the product produced from the β-aromatic sulfonhydrazide during the development with an azo dyestuff coupling component. It appears that the oxidation conditions which prevail during such development convert said β-aromatic sulfonhydrazide to an aromatic diazo sulfone. The latter compound is capable of reacting with a coupling component the same as any true diazonium salt. In other words, during the reduction of the silver salt, the β-aromatic sulfonhydrazide is conditioned for reaction with the azo coupling component, as a consequence of which an azo dyestuff image is formed in situ with the silver image.

It is to be pointed out that by "prints" we mean latent images which have been obtained by exposing a sensitive photographic emulsion of higher contrast than is ordinarily used for negative material, for a longer period of time than is customarily used for negative exposure in a camera. On the other hand, "bleached silver images" are to be understood as those obtained by reconversion of a negative or positive silver image into a silver salt image after treatment with an oxidizing agent in the presence of an anion capable of forming an insoluble silver salt. The term "residual silver salt image" is to designate an image resulting from the development of an original latent image to a silver image and consists of the silver halide unaffected by original exposure and first development.

It is accordingly an object of the present invention to produce azo dyestuff images in color film by the utilization as a developing agent of a β-aromatic sulfonhydrazide.

It is a further object of this invention to produce azo dyestuff images in color film by the utilization as a developing agent of a β-aromatic sulfonhydrazide in which the sulfur atom is substituted by hydroxyl or the corresponding alkali metal or ammonium salts, or by an alkyl or an aromatic radical.

It is a further object of this invention to produce azo dyestuff images by reacting a coupling component with the product resulting from the oxidation of an aforesaid β-aromatic sulfonhydrazide during the development of a print, a bleached silver image or a residual silver salt image.

It is a further object of this invention to process silver halide emulsions leading to color film containing azo dyestuff images by developing a print, a bleached silver image or a residual silver salt image with an aforesaid β-aromatic sulfonhydrazide and reacting the oxidation product of said β-aromatic sulfonhydrazide with an azo dyestuff coupling component.

It is a further object of this invention to provide a color developer comprising an aforesaid β-aromatic sulfonhydrazide and an azo dyestuff coupling component.

It is a further object of this invention to develop a silver halide emulsion containing an azo dyestuff coupling component fast to diffusion by means of an aforesaid β-aromatic sulfonhydrazide by which an azo dyestuff is produced in situ with the silver image.

It is a further object of this invention to facilitate the aforesaid coupling reaction by the utilization of a nitrogenous base.

Other and further important objects of the invention will be apparent as the description proceeds.

The β-aromatic sulfonhydrazides which we employ according to the present invention are embraced by the following general formula:

$$X-NH-NHSO_2R$$

in which X is an aromatic radical such as phenyl, naphthyl and the like, R is hydroxy or the corresponding alkali metal or ammonium salt radical, alkyl or an aromatic radical. While the invention can be effected with compounds of this formula, it has been ascertained that certain properties of the aromatic sulfonhydrazides must be taken into consideration in selecting those which will give the best results. Among these factors are (1) Stability of the compounds,
(2) Speed of development, and
(3) Speed of coupling.

It has been further ascertained, and this is an important aspect of the invention, that these factors are greatly affected by the substituents on the aromatic ring joined to the β-nitrogen atom on the one hand and on the aromatic radical joined to the sulfur atom on the other hand. Thus experiments have shown that where the aromatic ring joined to the nitrogen atom on the one hand and the aromatic radical represented by R on the other hand are substituted by electropositive groups or substituents, the rate of development is most rapid. The stability of the compounds is decreased considerably when the aromatic radical joined to a sulfur atom is substituted by an electronegative substituent. The rate of coupling of the diazo sulfones leading to the azo dye is more rapid when the substituent on said aromatic ring joined to a nitrogen atom is neutral or weakly electropositive. An electronegative substituent on said aromatic radical represented by R is found in many cases to increase the speed of coupling. From these experiments the conclusions have been reached that in the preferred compounds the substituents on the aromatic radical joined to the β-nitrogen atom should be either electropositive or neutral, whereas the substituents on the aromatic radical represented by R may be neutral, electropositive or electronegative.

By electropositive radicals is meant those radicals which are electron donating in character, such as the acylamido and alkoxyl radicals. Neutral radicals or groups are hydrogen and alkyl groups. The electronegative radicals are those which possess electron attracting properties, such as halogen, nitro, sulfo, carboxy and the like.

The β-aromatic sulfonhydrazides which have been found most suitable for my purposes may therefore be more specifically defined by the following formula:

$$(X_1-NH-NHSO_2R)_n$$

wherein $X_1$ is an aromatic hydrocarbon such as phenyl, naphthyl, diphenyl and the like, and such radicals substituted by a neutral or electropositive radical such as alkoxy i. e. methoxy, ethoxy, propoxy and the like, aryloxy i. e. phenoxy and the like, primary amino, substituted amino such as alkylamino i. e. methylamino, dimethylamino, ethylamino, diethylamino, propylamino, butylamino, arylamino such as phenylamino and the like, acylamido such as alkyl carbonamido i. e. acetamido, propionamido, butyramido and the like, arylcarbonamido such as benzamido and the like, sulfonamido such as alkyl sulfonamido i. e. methylsulfonamido, ethylsulfonamido and the like, and arylsulfonamido such as phenylsulfonamido and the like, R is OH or the corresponding alkali metal and ammonium salt groups, alkyl such as ethyl, methyl, propyl, butyl, hexyl, decyl, dodecyl, stearyl and the like, or such radicals containing a water-solubilizing group such as sulfo, carboxy, hydroxy ethenoxy and the like, or an aromatic radical such as phenyl, naphthyl, diphenyl, chlorphenyl, nitrophenyl, chlornaphthyl, hydroxy phenyl, hydroxy naphthyl, alkylphenyl, alkoxyphenyl, hydroxy diphenyl, aminophenyl, alkylaminophenyl, arylaminophenyl and amidophenyl, the alkoxy, amino, alkylamino, arylamino, amido and alkyl groups having the values stated previously, and $n$ being 1 or 2. While it is true that the aromatic radical represented by R may bear negative substituents, it is advisable when employing such groups to limit the substitution of the aromatic ring to one such group since otherwise the stability of the compound may suffer.

Examples of compounds which fall within this general classification are listed below:

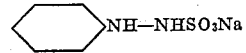

Sodium salt of phenyl hydrazine sulfonic acid

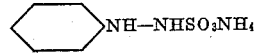

Ammonium salt of phenyl hydrazine sulfonic acid

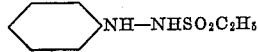

β-phenyl-ethanesulfonhydrazide

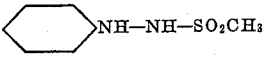

β-phenyl-methanesulfonhydrazide

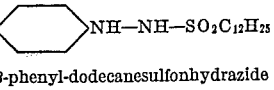

β-phenyl-dodecanesulfonhydrazide

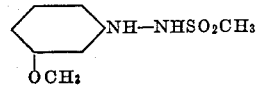

β-(3'-methoxy-phenyl) methanesulfonhydrazide

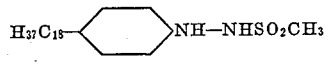

β-(p'-octadecyl-phenyl)-methanesulfonhydrazide

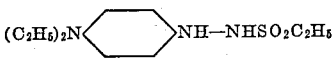

β-(4'-diethylamino-phenyl)-ethanesulfonhydrazide ing acetoacetanilide to form the azo dye with elimination of a sulfinic acid group:

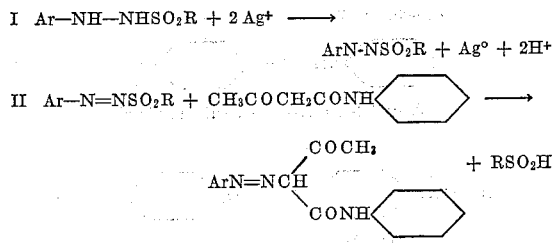

Similar reactions take place when the coupler is a phenol or the like.

It has been stated above that the sulfonhydrazides may contain an electronegative group in the aromatic radical represented by R. It is preferred, however, that such radical either be unsubstituted or be substituted by a neutral group such as alkyl or by an electropositive group such as an alkoxy, amino, acylamido or the like group, since it has been found that any sacrifice in coupling speed due to the presence of such a group is more than compensated for by an increase in the stability of the compounds. Should it transpire that the compounds selected have a low rate of coupling, coupling may be facilitated by the utilization of small quantities of a nitrogenous base incapable of coupling with a diazonium compound to form an azo dye such as ammonium hydroxide, an aliphatic amine, i. e., methylamine, dimethylamine, ethylamine, diethylamine, trimethylamine, ethanolamine, diethanolamine, triethanolamine, propanolamine, butylamine and the like or heterocyclic nitrogenous base such as pyridine, quinoline and the like. The aromatic amines are of course capable of coupling and consequently are excluded. Best results are secured while employing the heterocyclic nitrogenous bases and these are accordingly recommended for use.

The β-aromatic sulfonhydrazides are best suited for reducing an undeveloped print, a bleached silver image or a residual silver salt image to give, with coupling components, azo dye images of excellent density and gradation. It may be noted however, that they may also be used to reduce normal latent negative images particularly when the emulsion is one of extreme contrast which has been given sufficient exposure in the camera. Where R in the above formula is OH or a corresponding alkali metal or ammonium salt group the coupling reaction occurs satisfactorily only in the presence of ultraviolet radiation.

Any coupling component utilized in the azo dyestuff art may be employed for reaction with the diazosulfone compounds. These components, as is known, are aromatic compounds which contain a phenolic hydroxyl group, an amino group, an alkylamino group such as methylamino, ethylamino and the like, an arylamino group such as phenylamino and the like, said compounds having replaceable hydrogen atoms or groups in the o- or p-positions thereto. They may also be compounds which contain a reactive methylene group such as acetoacetic acid derivatives, pyrazolones, and the like.

Examples of such compounds are -naphthol, N-(β-naphthyl)-3-hydroxy-2-naphthamide, N-(o-tolyl)-3-hydroxy-2-anthramide, N-(1-anthryl) glycine, G salt, H acid, K acid, gamma acid, J acid, chromotropic acid, R salt, resorcinol, diacetoacetic-o-tolidide, salicyclic acid, o-cresotic acid, 2-hydroxy-3-naphthoic acid anilide, acetoacetanilide, 1-phenyl-5-pyrazolone and the like.

The process of producing azo dyestuff images by the utilization of said β-aromatic sulfonhydrazides may be effected in various ways. For instance, a film may be exposed and developed in a black and white developer, fixed, the image bleached to a silver salt image and re-developed with said β-aromatic sulfonhydrazide in the presence of an azo coupling component. Or a silver halide emulsion may be exposed, developed in a black and white developer, re-exposed and developed with the β-aromatic sulfonhydrazide in the presence of the coupling component. Again, a silver halide emulsion containing a coupling component fast to diffusion may be processed as above.

The color developing solutions are generally alkaline in nature and the alkalinity may be supplied by means of an alkali metal carbonate such as sodium carbonate, potassium carbonate and the like, or an alkali metal hydroxide such as sodium hydroxide, potassium hydroxide, etc. The said β-aromatic sulfonhydrazide is dissolved or dispersed in the alkaline solution. Generally the —NHSO₂R group of the hydrazide is sufficiently acidic to make the compound soluble in the alkaline solution. In the event, however, that such grouping does not render the compound sufficiently soluble, a water-solubilizing group such as a sulfonic acid or carboxylic acid group should be incorporated into the alkyl or aryl radical linked to the sulfur atom. It is of course evident that where R in the above formula stands for OH or the corresponding alkali metal or ammonium salt group, the compound will be soluble in an alkaline solution.

As is evident, the gradation of the dyestuff images will vary with the particular β-aromatic sulfonhydrazide selected. Should a sulfonhydrazide be employed which gives poor gradation, the selection however being dictated because of advantages resulting from stability of the developer, speed of development, speed of coupling or the production of a particular dyestuff shade, the gradation may be improved by the utilization of small amounts of an aliphatic aldehyde such as formaldehyde or acetaldehyde which may be incorporated in the developing bath. Good results have been obtained when utilizing amounts of the aldehyde ranging from 1 to 5 parts for each liter of developer.

As previously indicated, the process may be effected while utilizing the coupling components in the silver halide emulsion provided that the coupling components are rendered fast to diffusion. This result may be accomplished by including in the molecule of the coupling component a substantive group such as benzidine, stilbene or a like radical, or by the introduction of a molecular enlarging group such as a natural resin, a synthetic resin, a sterol, a carbohydrate, a terpene, or a long fatty chain. The means by which fastness to diffusion may be effected are described in United States Patents 2,178,612, 2,179,228, 2,179,238, 2,179,239, 2,179,244, 2,186,685, 2,186,719, 2,186,732, 2,186,733, 2,186,734, 2,186,849, 2,186,851, 2,186,852, 2,280,722, etc. The preferred method for rendering the coupling components fast to diffusion is by the introduction of a long fatty chain and good results have been secured when using as such chain a decyl, dodecyl, stearyl and similar radicals. The coupling components may be located in emulsion layers of a three-layer film, a bi-pack or the like, or in a gelatin layer super-

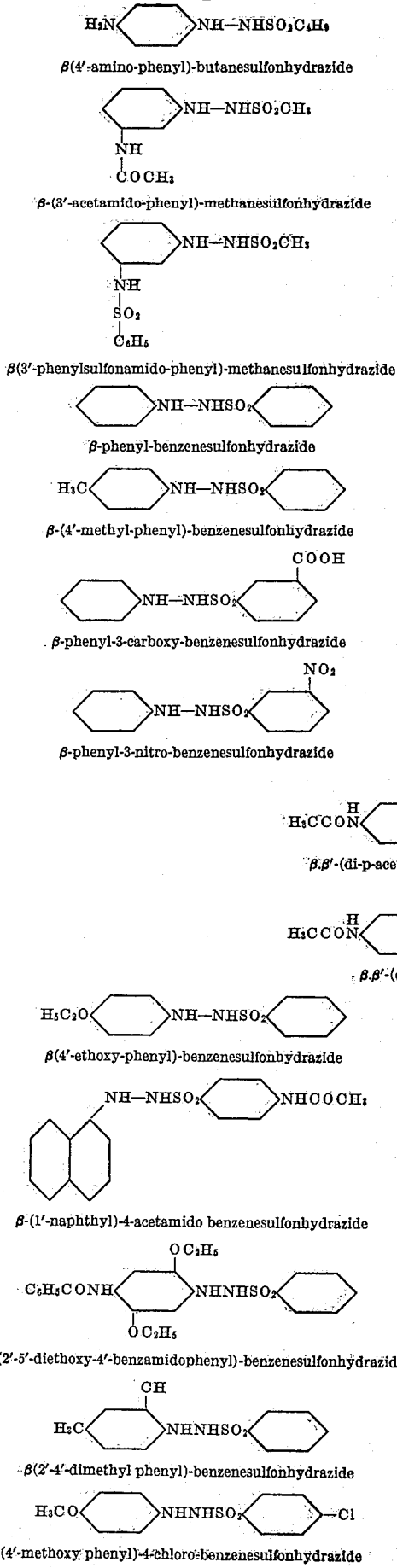
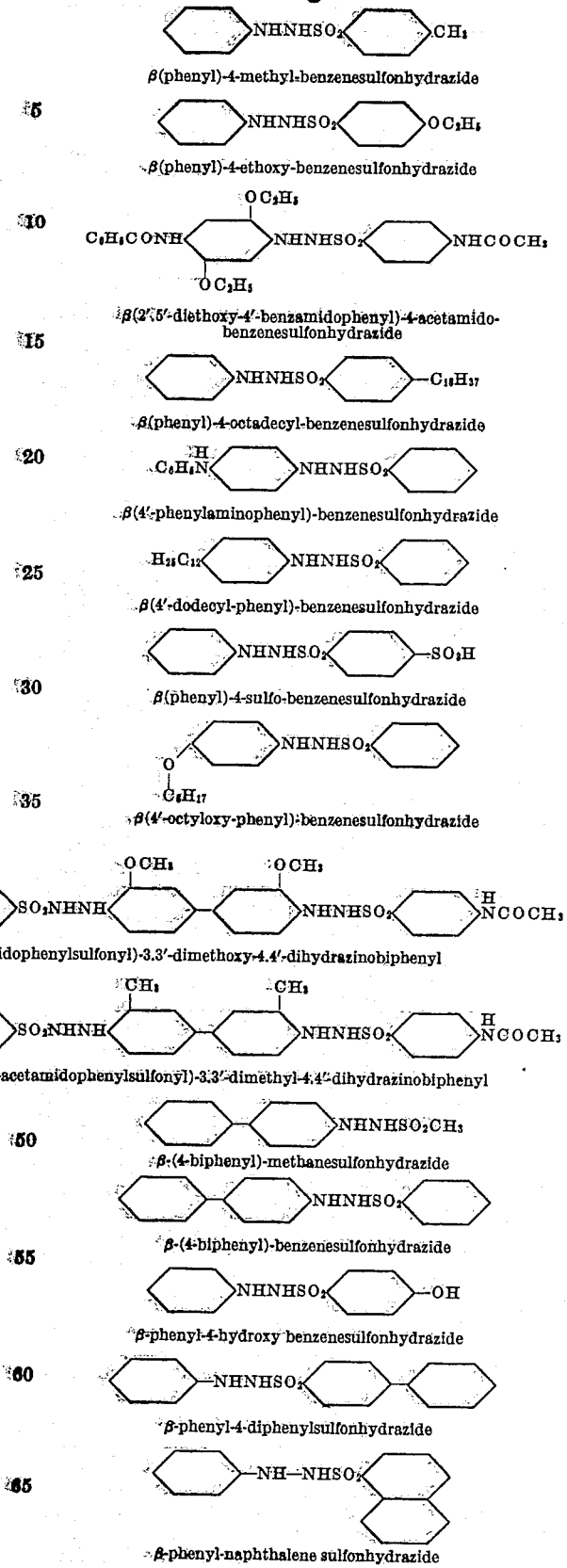
The reaction by which the azo dyestuffs are produced may be graphically represented as follows, Reaction I indicating the formation of the diazo compound from the β-aromatic sulfonhydrazide during development, and Reaction II indicating the coupling of the diazo compound with a coupling component here indicated as beimposed on the emulsion layer. The coupling components are selected so that subtractively colored dyestuff images are obtained in each of the layers.

Said β-aromatic sulfonhydrazides may be produced by methods already described in the literature. Such methods involve condensation of an arylhydrazine with a sulfonyl chloride, reduction of a diazo sulfone with zinc dust or sulfur dioxide, condensation of an arylhydrazine with a sulfinic acid, and reduction of a diazonium salt with sulfur dioxide or sodium hydrosulfite.

The following examples are illustrative of the invention but it is to be understood that the invention is not restricted thereto. The parts are by weight unless otherwise stated.

*Example 1*

A solution of 2,5-diethoxy-4-benzamido-benzene-diazonium chloride prepared from 30 parts of 2,5-diethoxy-4-benzamidoaniline in 500 parts of water is added to a cold solution of 22 parts of p-acetamidobenzene sulfinic acid and 13.8 parts of potassium carbonate in 500 parts of water. The combined solution is slowly acidified with cold 4-N-hydrochloric acid to a pH of 2. After the mixture has remained at room temperature for one-half hour, the orange-colored diazo sulfone is removed by filtration and washed well with water. The material after drying in a vacuum desiccator over phosphorus pentoxide amounted to 33 parts, representing a yield of 65 per cent. It melted at 110° C. with decomposition. The product is 2,5-diethoxy-4-benzamidobenzenediazo-(p-acetamidophenyl)-sulfone.

A solution of 25.5 parts of the above diazosulfone in a mixture of 500 cc. of acetone, 7.5 parts of glacial acetic acid and 10 parts of $H_2O$ is slowly treated at room temperature under vigorous stirring with zinc dust until the solution turns from a deep orange to a faint yellow color.

The zinc compounds are removed by filtration, and the cooled filtrate is diluted with 250 parts of water. The sulfonhydrazide, which separates, is removed by filtration and dried in a vacuum desiccator over phosphorus pentoxide. The yield is 16 parts or 62%. The material when recrystallized from dilute ethanol melted at 166° C. with decomposition.

A photographic film containing a light-sensitive silver bromide emulsion is exposed and developed in a metol-hydroquinone developer. The film after washing is re-exposed to light and processed for 15 minutes at 15 to 20° C. in a color developer of the following composition:

0.2 part of β-(2,5-diethoxy-4-benzamidophenyl)-p-acetamidobenzenesulfonhydrazide dissolved in

| | Parts |
|---|---|
| Ethanol | 10 |
| N-(β-naphthyl)-3-hydroxy-2-naphthamide | 0.2 |
| 10% aqueous potassium hydroxide solution | 10 |
| Pyridine | 1.0 |
| 37% aqueous formaldehyde | 0.2 |
| Water | 85 |

After development, the film is then bleached with a bleaching solution of the following composition:

| | Parts |
|---|---|
| Water | 1000 |
| Potassium ferricyanide | 100 |
| Disodium phosphate | 4.3 |
| Monopotassium phosphate | 5.8 |

The film is then thoroughly washed and fixed in an acid hardening hypo bath. After removal of the hypo by washing, and drying of the film, there remains a blue azo dye image having the following constitution:

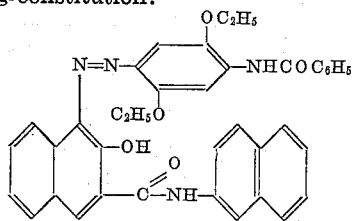

*Example 2*

An exposed strip film bearing a silver bromide emulsion is processed as in Example 1 through the second exposure and is then developed in a color developer having the following composition:

0.2 part of β,β'-(p-di-acetamidobenzenesulfonyl(-3.3'-dimethyl-4.4'-dihydrazinobiphenyl dissolved in

| | Parts |
|---|---|
| Ethanol | 10 |
| N-(o-tolyl)-3-hydroxy-2-anthramide | 0.2 |
| Aqueous potassium hydroxide | 10 |
| Pyridine | 5.0 |
| 37% aqueous formaldehyde solution | 0.2 |
| Water | 85 |

The emulsion is bleached and fixed, yielding a film strip containing a green azo dyestuff image having the following constitution:

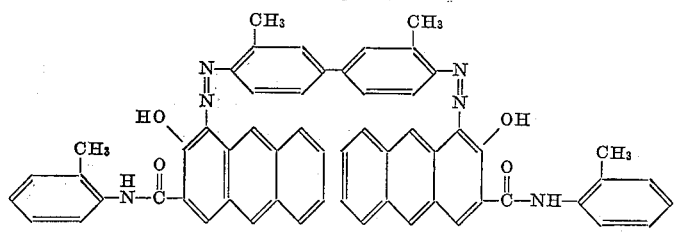

The β,β'-(p-di-acetamidobenzenesulfonyl)-3.3'-dimethyl-4.4'-dihydrazinobiphenyl is obtained by a method similar to that utilized in preparing the sulfonhydrazide of Example 1.

*Example 3*

To a solution of 43 parts of phenylhydrazine in 180 parts of ether chilled in an ice bath, there is slowly added with stirring 44.3 parts of 3-chlorosulfonyl benzoic acid in 180 parts of ether.

After the mixture has remained at room temperature for one hour, 250 cc. of a low boiling petroleum ether is added and the solid material is removed by filtration and washed with petroleum ether. The product is digested with one liter of dilute hydrochloric acid to remove the phenylhydrazine hydrochloride and the residue is recrystallized from dilute ethanol. 44 parts of a product are obtained representing a yield of 75%. The product is β-phenyl-3-carboxybenzenesulfonhydrazide which has a melting point of 178° C. with decomposition.

A photographic film containing a silver halide emulsion is exposed and developed in a metol-hydroquinone developer. The film is washed, re-exposed to light and developed for 15 minutes at 15 to 20° C. in a bath of the following composition:

0.2 part of β-phenyl-3-carboxybenzenesulfonhydrazide dissolved in

| | Parts |
|---|---|
| Ethanol | 10 |
| β-naphthol | 0.2 |
| Aqueous potassium carbonate | 10 |
| Pyridine | 1.0 |
| 37% aqueous formaldehyde solution | 0.2 |
| Water | 85 |

After development, the film is washed and bleached for 5 minutes in a bath as described in Example 1. The washed film strip is then fixed in a bath of 20% aqueous sodium thiosulfate. The resulting film contains an orange azo dye image of the following constitution:

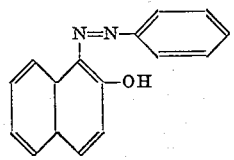

*Example 4*

A multilayer film sold under the trade name "Ansco Color" is exposed, developed to black and white as in Example 1 and after re-exposure is color developed for 20 minutes in a bath of the following composition:

0.2 part of β-phenyl-3-carboxybenzenesulfonhydrazide dissolved in

| | Parts |
|---|---|
| Ethanol | 10 |
| Potassium carbonate solution | 10 |
| Pyridine | 2.0 |
| 37% aqueous formaldehyde solution | 0.2 |
| Water | 85 |

The film is then bleached and fixed as in Example 1, thereby yielding a yellow-green azo dye image in the first layer, a yellow azo dye image in the second layer, and a red azo dye image in the third layer.

*Example 5*

4 parts of N-(3-octadecamidobenzyl) H-acid are dissolved in 5 cc. of sodium carbonate of 20% strength and 50 parts of water. The resulting solution is added to 1000 parts of a photographic silver bromide emulsion. The emulsion is coated, exposed, developed in a black and white developer as in Example 1 and then developed with the sulfonhydrazide developer described in Example 3. After further processing the film as in Example 1, there is obtained a magenta dyestuff image of the following constitution:

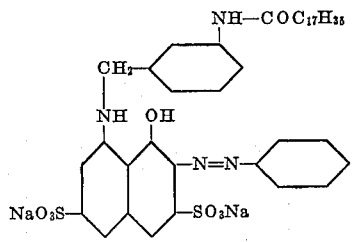

I am aware of the existence of U. S. P. 2,339,213, which discloses the employment of aromatic hydrazines with suitable coupling agents for the production of azo dyestuff images in silver halide emulsions. The aromatic hydrazines employed in the patent, however, do not contain an alkyl or aryl sulfonyl group or sulfo salt groups as in the compounds of our invention. Accordingly, the reaction by which the dyestuffs are formed is different. In addition, as previously pointed out, it is possible with our color developers to vary the properties by suitable selection of the substituents on the various aryl groups present in the molecule. Inasmuch as said properties have a direct bearing upon the processing of the film, as previously explained, the processing can be better regulated when using the sulfonhydrazides in lieu of the phenyl hydrazines of the patent.

Various modifications of our invention will occur to persons skilled in the art and we therefore do not intend to be limited in the patent granted except as necessitated by the prior art and the appended claims.

We claim:

1. The process for the production of azo dyestuff images in an exposed silver halide emulsion layer which comprises subjecting said emulsion to development with a solution of a β-aromatic sulfonhydrazide in the presence of an azo dye coupling component.

2. The process as defined in claim 1 wherein the azo dye coupling component is located in the solution of the β-aromatic sulfonhydrazide.

3. The process as defined in claim 1 wherein the solution of the β-aromatic sulfonhydrazide is an aqueous alkaline solution.

4. The process of producing an azo dyestuff image in a photographic element bearing a silver halide emulsion containing an exposed silver halide image which comprises subjecting said emulsion to development with a β-aromatic sulfonhydrazide whereby said image is converted into a silver image and said sulfonhydrazide is simultaneously converted into a diazosulfone, and coupling said diazosulfone with an azo dye coupling component, in the presence of a nitrogenous base incapable of coupling to form an azo dye, to facilitate the coupling reaction.

5. The process as defined in claim 1 wherein the solution of the β-aromatic sulfonhydrazide contains a small quantity of an aliphatic aldehyde for the purpose of improving the gradation of the azo dyestuff image.

6. The process as defined in claim 1 wherein the coupling takes place in the presence of a small quantity of an aliphatic aldehyde to improve the gradation of the azo dyestuff image.

7. The process of producing an azo dyestuff image in a photographic element bearing a silver halide emulsion, said element containing an azo dyestuff coupling component fast to diffusion and in said emulsion an exposed silver halide image which comprises subjecting said element to the action of a solution of a β-aromatic sulfonhydrazide whereby said image is developed to a silver image, and an azo dyestuff is formed in situ with the silver image by coupling of the coupling component with the oxidation product of said hydrazide.

8. The process as defined in claim 1 wherein said β-aromatic sulfonhydrazide has the following formula:

$$X-NH-NHSO_2R$$

X being an aromatic radical, R being a member of the class consisting of OH, O-alkali metal, O—NH$_4$, alkyl and an aromatic radical.

9. The process as defined in claim 4 wherein said β-aromatic sulfonhydrazide has the following formula:

$$X_1\text{—NH—NHSO}_2R$$

wherein R is a member of the class consisting of OH, O-alkali metal, O—NH₄, alkyl and an aromatic radical and $X_1$ is a member of the class consisting of aryl, alkoxyaryl, aryloxyaryl, aminoaryl and acylaminoaryl radicals.

10. The process as defined in claim 7 wherein said β-aromatic sulfonhydrazide has the following formula:

$$X_1\text{—NH—NHSO}_2R$$

R being a member of the class consisting of OH, O-alkali metal, O—NH₄, alkyl and an aromatic radical and $X_1$ being a member of the class consisting of aryl, alkoxyaryl, aryloxyaryl, aminoaryl and acylaminoaryl radicals.

11. A color developer comprising a solution of a β-aromatic sulfonhydrazide and an azo dyestuff coupling component.

12. A color developer comprising a solution of a β-aromatic sulfonhydrazide, an azo dye coupling component and a small amount of a nitrogenous base incapable of coupling to produce an azo dye and operating to facilitate coupling of the azo dye coupling component with the oxidation products of the β-aromatic sulfonhydrazide.

13. The composition as defined in claim 11 wherein the solution is an aqueous alkaline solution.

14. A color developer comprising a solution of a β-aromatic sulfonhydrazide having the following constitution:

$$X\text{—NH—NHSO}_2R$$

in which R is a member of the class consisting of OH, O-alkali metal, O—NH₄, alkyl and an aromatic radical, and X is an aromatic radical and an azo dye coupling component.

15. The composition as defined in claim 14 wherein the solution is an aqueous alkaline solution.

16. A color developer comprising a solution of a β-aromatic sulfonhydrazide having the following constitution:

$$X_1\text{—NH—NHSO}_2R$$

in which R is a member of the class consisting of OH, O-alkali metal, O—NH₄, alkyl and an aromatic radical, and $X_1$ is a member of the class consisting of aryl, alkoxyaryl, aryloxyaryl, aminoaryl and acylaminoaryl radicals and an azo dye coupling component.

17. A color developer comprising a solution of a β-aromatic sulfonhydrazide having the following constitution:

$$X_1\text{—NH—NHSO}_2R$$

in which R is a member of the class consisting of OH, O-alkali metal, O—NH₄, alkyl and an aromatic radical and $X_1$ is a member of the class consisting of aryl, alkoxyaryl, aryloxyaryl, aminoaryl and acylaminoaryl radicals, an azo dye coupling component, and a small amount of a nitrogenous base incapable of coupling to form an azo dye and serving to facilitate the coupling of the azo dye coupling component with the oxidation products of the β-aromatic sulfonhydrazide.

18. The composition as defined in claim 14 in which there is present a small amount of an aliphatic aldehyde to improve the gradation of the azo dye formed by the color developer.

19. The process of producing a reversed azo dyestuff image in a photographic silver halide emulsion which comprises exposing a silver halide emulsion, developing the same in a black and white developer, re-exposing the emulsion, and developing the same in an aqueous alkaline solution of β-phenyl-3-carboxybenzene sulphonhydrazide and β-naphthol.

20. The process of producing an azo dyestuff image in a photographic silver halide emulsion which comprises exposing the emulsion, developing the same in a black and white developer, re-exposing the emulsion, and developing the same in an aqueous alkaline solution of β-(2.5-diethoxy - 4 - benzamidophenyl) -p-acetamido-benzenesulfonhydrazide and N-(β-naphthyl) -3-hydroxy-2-naphthamide.

21. The process of producing an azo dyestuff image in a photographic silver halide emulsion which comprises exposing the emulsion, developing the same in a black and white developer, re-exposing the emulsion and developing the same in an aqueous alkaline solution of β,β'-(p-diacetamidobenzenesulfonyl) - 3.3' - dimethyl-4.4'-dihydrazinobiphenyl and N(o-tolyl)-3-hydroxy-2-anthramide.

WILLY A. SCHMIDT.
JOSEPH A. SPRUNG.

REFERENCES CITED

The following references are of record in the file of this patent:

UNITED STATES PATENTS

| Number | Name | Date |
| --- | --- | --- |
| 1,934,011 | Schmidt et al. | Nov. 7, 1933 |
| 2,191,037 | Mannes et al. | Feb. 20, 1940 |
| 2,304,025 | Schneider et al. | Dec. 1, 1942 |
| 2,339,213 | Woodward et al. | Jan. 11, 1944 |
| 2,196,734 | Marriage | Apr. 9, 1940 |
| 2,266,442 | Schinzel | Dec. 16, 1941 |
| 2,276,254 | Schinzel | Mar. 10, 1942 |

FOREIGN PATENTS

| Number | Country | Date |
| --- | --- | --- |
| 462,140 | Great Britain | Mar. 3, 1937 |

Certificate of Correction

Patent No. 2,424,256. July 22, 1947.

WILLY A. SCHMIDT ET AL.

It is hereby certified that error appears in the printed specification of the above numbered patent requiring correction as follows: Column 5, next to the last formula, for that portion reading

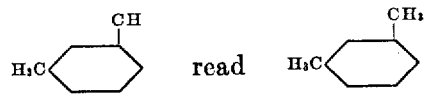

and that the said Letters Patent should be read with this correction therein that the same may conform to the record of the case in the Patent Office.

Signed and sealed this 14th day of October, A. D. 1947.

[SEAL]

THOMAS F. MURPHY,
*Assistant Commissioner of Patents.*